United States Patent [19]
Bridges

[11] 3,838,233
[45] Sept. 24, 1974

[54] ELECTRIC CIRCUIT DISCONNECT MEANS FOR A POWER TRANSMISSION LINE

[76] Inventor: Ronald P. Bridges, c/o Bridge Electric, Inc., 2451 Wisconsin St., Downers Grove, Ill. 60515

[22] Filed: Sept. 27, 1973

[21] Appl. No.: 401,338

Related U.S. Application Data

[63] Continuation of Ser. No. 282,180, Aug. 21, 1972 abandoned.

[52] U.S. Cl. ............ 200/48 R, 174/50, 174/182
[51] Int. Cl. ............................................. H01h 31/00
[58] Field of Search.......... 174/50, 182, 141 R, 180; 200/48 R; 151/5

[56] References Cited
UNITED STATES PATENTS
1,109,470   9/1914   Sandford, Jr. .................... 174/150
3,300,599   1/1967   Lankford ......................... 200/48 R Primary Examiner—Herman Hohauser
Attorney, Agent, or Firm—Wegner, Stellman, McCord, Wiles & Wood

[57] ABSTRACT

An electric circuit disconnect switch for a power transmission line has a series of cap and pin strain insulators threadedly connected to one another, and threadedly connected to the ends of the series are an electrically conductive hinge terminal bracket and an electrically conductive jaw terminal bracket, each of which is adapted to be electrically connected into a power transmission line. A bridging blade is pivoted on the hinge terminal bracket for separable connection with the jaw terminal bracket.

7 Claims, 6 Drawing Figures

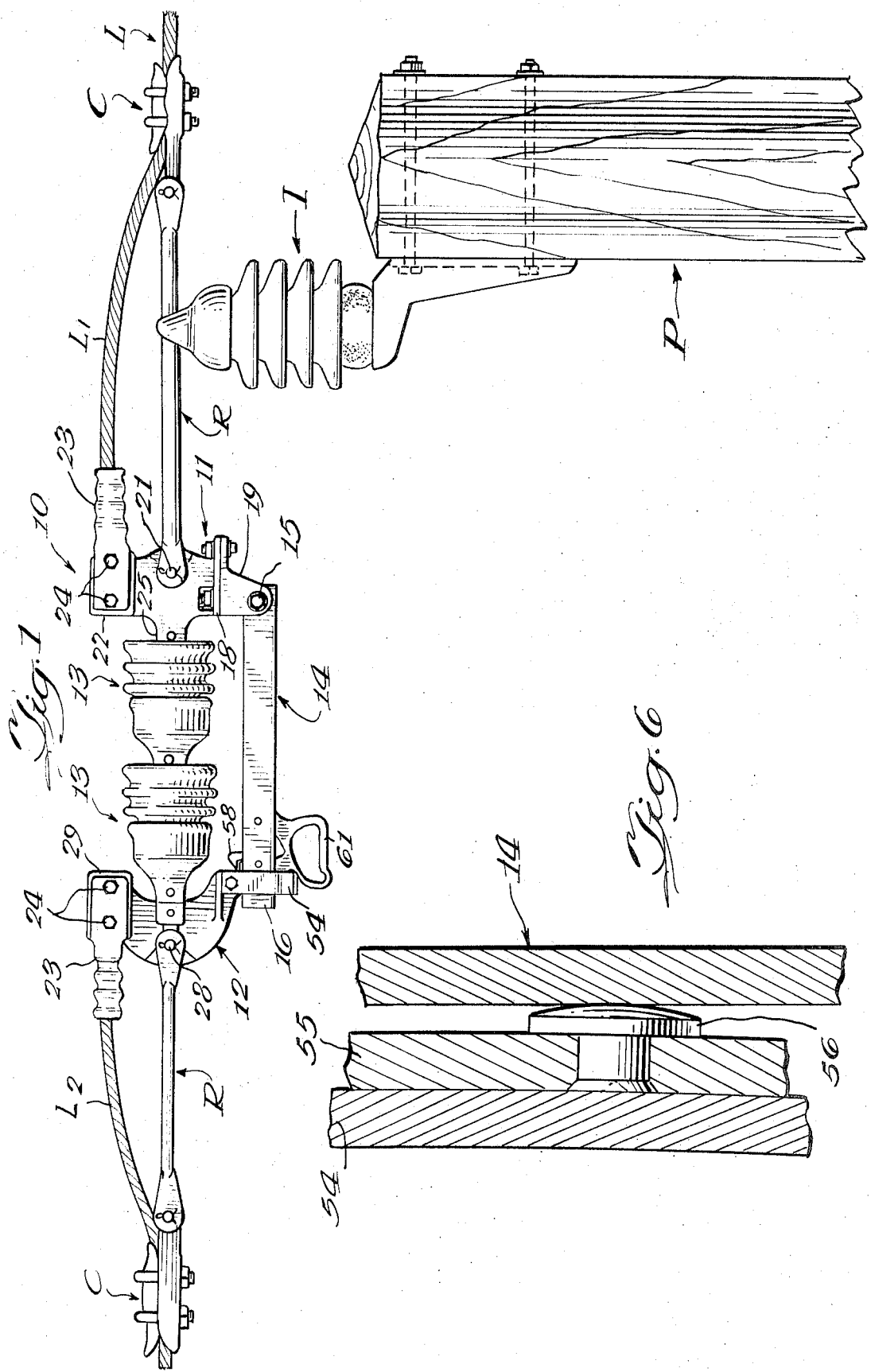

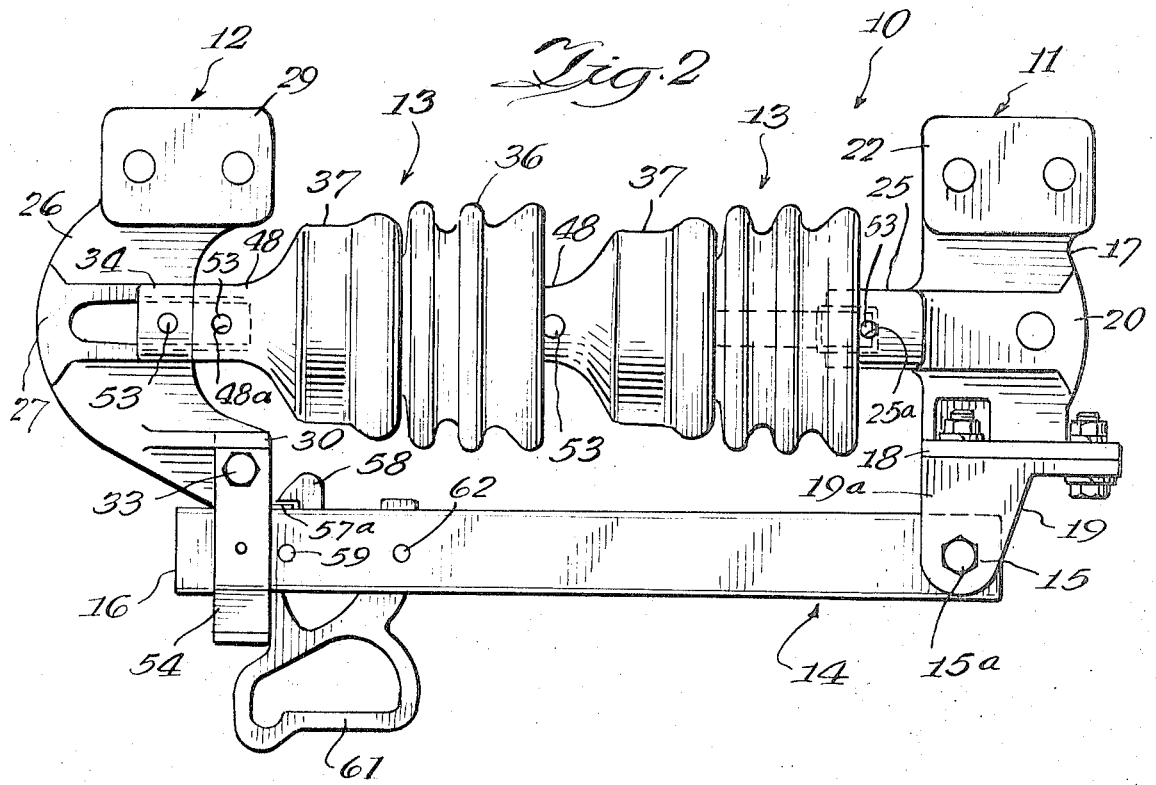
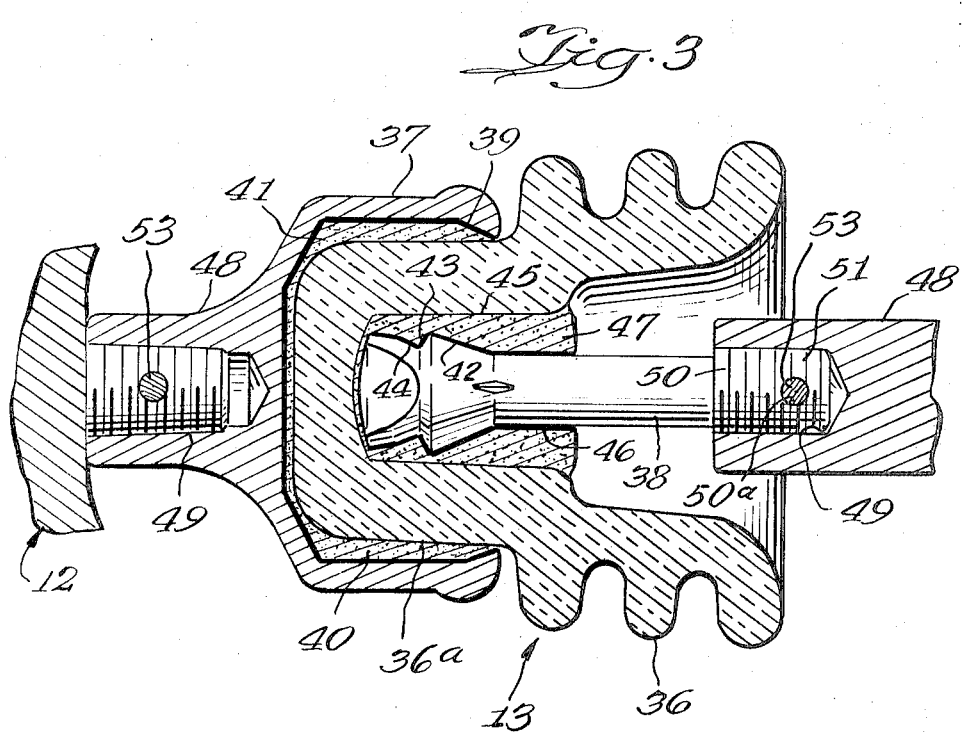

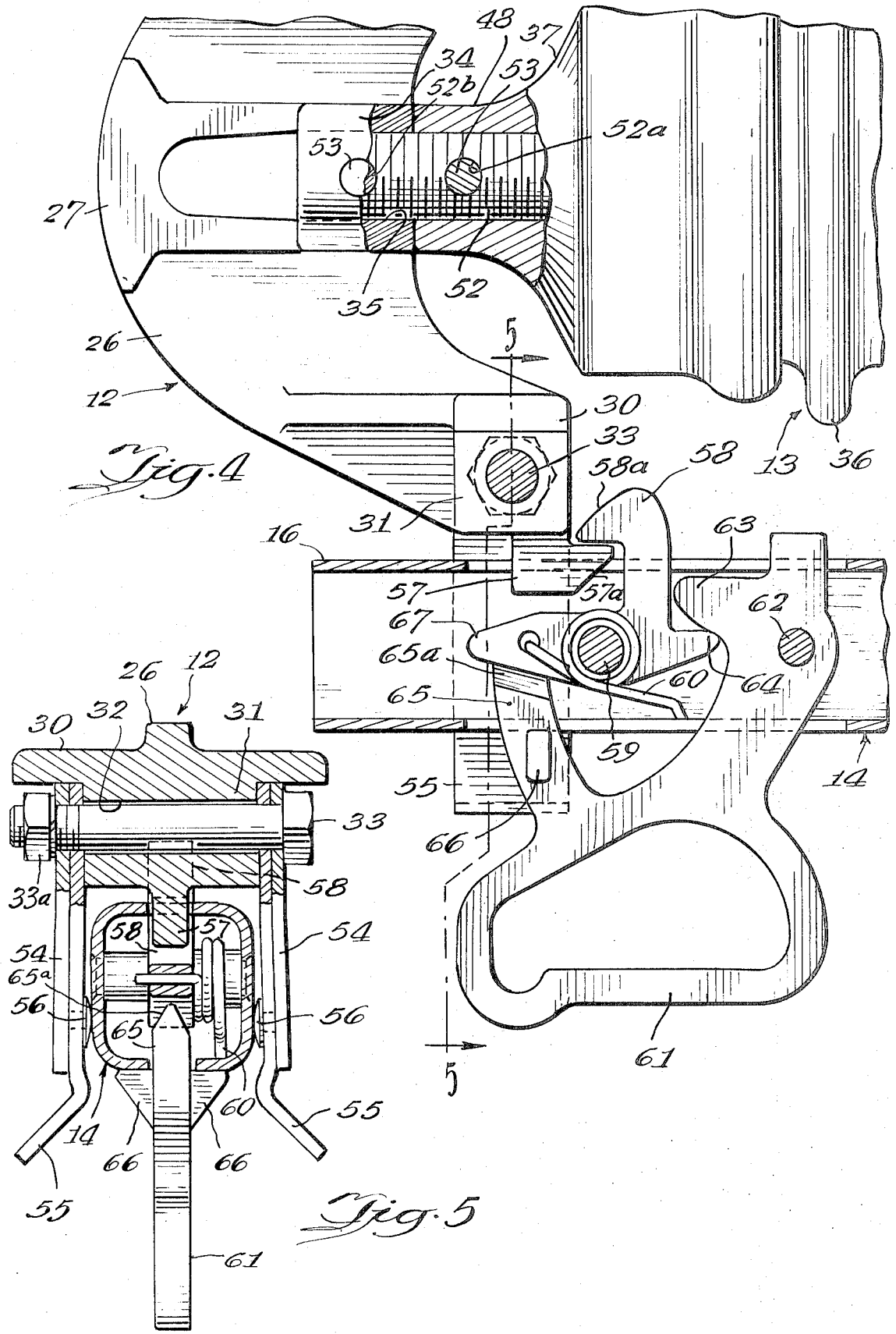

3,838,233

ELECTRIC CIRCUIT DISCONNECT MEANS FOR A POWER TRANSMISSION LINE

This is a continuation, of application Ser. No. 282,180 filed Aug. 21, 1972, abandoned.

BACKGROUND OF THE INVENTION

In an effort to eliminate overhead cross arms and make overhead distribution systems more compact and less obtrusive, the electric power industry for many years has used a type of switch known as a line tension disconnect. Such switches are made and sold by several manufacturers, and have been in use for perhaps thirty or forty years. Prior art switches of this type place a porcelain insulator directly in tension in the overhead line, and suspend a disconnect switch beneath the insulator. This structure, however, has the great disadvantage of requiring a very heavy and expensive porcelain insulator because of the fact that porcelain has a relatively low strength in tension. Accordingly, line tension disconnects heretofore available have been inordinately expensive; and they have also been so heavy as to place an undesirable strain on an overhead electric line in which they are mounted.

The most compact, lightest weight, and least expensive circuit disconnect switch in the prior art is disclosed in applicant's U.S. Pat. No. 3,510,611. Using a 15KV, 600 ampere rated switch for comparison, the switch of U.S. Pat. No. 3,510,611 weighs about 25 pounds as compared to about 40 pounds for a typical competitive switch. A switch embodying the present disclosure weighs less than 15 pounds. Obviously, this is a very significant difference for a unit the weight of which is carried by a power transmission line, and which must be manually connected into a line.

SUMMARY OF THE INVENTION

The electric circuit disconnect switch of the present invention utilizes a series of cap and pin strain insulators which are threadedly connected to one another. Threadedly connected to opposite ends of the series are an electrically conductive hinge terminal bracket and an electrically conductive jaw terminal bracket; and a bridging blade is pivoted on the hinge terminal bracket for separable connection with the jaw terminal bracket. The switch is mounted as a line tension disconnect in the customary fashion, and as previously indicated is extremely advantageous because of its light weight. Further, switches having different rated capacities in terms of kilovolts may be made up by varying the number of cap and pin strain insulators in the series and by matching the length of the bridging blade to the length of the series. The same terminal brackets may be used for switches of various sizes.

The term "cap and pin strain insulator" is used in the present disclosure and claims to define an insulator of the cap and pin type which is assembled in such a way that a porcelain insulator member is placed in compression, rather than in tension, by reason of the nature of the connection between the porcelain insulator, the metal cap and the metal pin. This type of insulator is generally well known in the art, but such an insulator for use in the combination of the present invention is modified so that it is structurally different from those known in the prior art.

Specifically, the metal cap of a cap and pin strain insulator is fastened to the porcelain insulator member by means of a layer of cement, and there is a thin cushioning layer of resilient asphalt between the inner surface of the cap and the cement so that endwise pull on the cap is transmitted to the body of the insulator member as a compressive force. The same expedient is used in the connection between the metal pin and the porcelain insulator member.

Accordingly, the principal object of the present invention is to provide an improved electric circuit disconnect switch for a power transmission line.

Another object of the invention is to provide a line tension disconnect switch of extremely light weight and economical construction.

Yet another object of the invention is to provide a line tension disconnect switch in which the insulation is solid porcelain but the porcelain is not placed under tensile stress.

Yet another object of the invention is to provide a line tension disconnect structure which may be readily adapted to various voltage ratings by the number of insulator units which are connected together in series.

Still another object of the invention is to provide a line tension disconnect switch which, especially in the higher voltage ratings, does not rely upon a single insulator unit for insulation. Thus, even if one or more of the insulators is damaged, as by having its skirts shot away, the switch is still a functional device although with reduced insulation level.

THE DRAWINGS

FIG. 1 is a side elevational view of a 15KV, 600 ampere rated electric circuit disconnect switch embodying the invention, mounted in an overhead electric power transmission line;

FIG. 2 is a side elevational view of the switch on a scale larger than FIG. 1;

FIG. 3 is a fragmentary longitudinal central sectional view on enlarged scale, illustrating the left hand insulator of FIG. 2 and its connection to the jaw terminal bracket and the right hand insulator;

FIG. 4 is an enlarged fragmentary sectional view of the jaw terminal bracket, the left hand insulator, and the latchend of the bridging blade;

FIG. 5 is a sectional view taken substantially as indicated along the line 5—5 of FIG. 4; and FIG. 6 is a greatly enlarged sectional view of a jaw shoe assembly.

DETAILED DESCRIPTION OF THE INVENTION

The electric circuit disconnect switch illustrated in the drawings is rated at 15KV, 600 amperes, 40,000 amperes momentary, and weighs 14.5 pounds. By adding a third insulator and lengthening the bridging blade correspondingly, a disconnect switch is provided which is rated at 27KV, 600 amperes, 40,000 amperes momentary, and weighs 19 pounds. No change is required in the hinge terminal bracket or the jaw terminal bracket.

Referring to the drawings in greater detail, and referring first to FIG. 1, the electric circuit disconnect switch of the present invention, indicated generally at 10, is illustrated as mounted in an overhead power transmission line L which is carried on a line of posts such as the post P by means of insulators such as the insulator I. The switch 10 includes generally an electrically conductive hinge terminal bracket, indicated generally at 11, an electrically conductive jaw terminal bracket indicated generally at 12, a pair of cap and pin strain insulators 13 which are mounted between the terminal brackets 11 and 12, and a bridging blade, indicated generally at 14, which is pivotally mounted at 15 on the hinge terminal bracket 11 and is separably connected with the jaw terminal bracket at its free end 16.

The switch 10 is supported in the power transmission line by a pair of mounting rods, indicated generally at R, which connect with mounting clamps C, and the power line L has extensions L1 and L2 which are connected, respectively, to the hinge terminal bracket 11 and the jaw terminal bracket 12. The means by which the switch 10 is supported in the line L is conventional, as is the connecting of the line portions L1 and L2 to the disconnect switch structure.

Referring now particularly to FIG. 2, the hinge terminal bracket 11 of the switch 10 includes an aluminum body 17 which has a transverse web 18 at its lower end to which a hinge fitting 19 is bolted. The central area of the hinge terminal bracket 17 provides a generally planar mounting area 20 to receive the end of a supporting rod R which is connected to it by a headed pin 21 that is held in place by a cotter pin. At the top the hinge terminal bracket 17 is another flat mounting area 22 to which the line L1 is electrically connected by means of a nipple 23 and bolts and nuts 24. Aligned with the planar connecting area 20 is a hollow boss 25 having internal threads (not shown) to threadedly receive the pin portion of the right hand insulator 13 as will be described in more detail hereafter.

The jaw terminal bracket 12 is similar to the hinge terminal bracket 11 in that it includes a body portion 26 which has a central planar connecting area 27 to which a mounting rod R is connected by a pin 28, and it also has a flat connecting area 29 to receive a mounting nipple 23 and bolts 24 so that the portion L2 of the power line L is connected to the jaw terminal bracket as seen in FIG. 1. At the lower end of the jaw terminal bracket 12 is a transverse mounting flange 30 which has a depending central portion 31 that is bored at 32 to receive a mounting bolt 33 for a jaw assembly which will be described in detail hereafter.

The jaw terminal bracket also has a hollow boss 34 which is seen in FIG. 4 to be threaded at 35 so that the left hand insulator 13 may be connected to it as will be described hereafter.

Referring now particularly to FIG. 3, each of the cap and pin strain insulators 13 includes a porcelain insulator 36, an aluminum cap 37, and a galvanized iron pin 38. The connection between the insulator 36, the cap 37 and the pin 38 is such that the tensile strains produced on the insulator by its mounting in an electric line are converted generally to compressive strains. In order to accomplish this, the cap 37 has an inturned outer flange 39; and between the cap and a bonding mass of cement, 40, is a layer of relatively resilient asphalt 41. The asphalt permits enough endwise motion between the aluminum cap 37 and the insulator 36 as to cause the end flange 39 of the cap 37 to press the cement layer 40 circumferentially into compressive engagement with a connecting portion 36a of the insulator.

Similarly, the pin 38 has cooperating surfaces 42, 43 and 44 which cooperate to produce a compressive force against an inner surface 45 of the connecting portion 36a of the insulator, with the compressive force being permitted by a thin layer of asphalt 46 between the pin 38 and a cement mass 47 by means of which the pin is firmly connected to the porcelain insulator 36.

In order that the cap and pin strain insulators 13 may be connected to one another in series and to the terminal brackets 11 and 12, the aluminum cap 37 has an integral hollow boss 48 which is internally threaded at 49; and the pin 38 has an enlarged outer end portion 50 which is provided with an external thread 51 which may threadedly engage either the thread 49 of a cap boss 48 or the internal thread of a terminal bracket boss 25 or 34, as the case may be.

Accordingly, as shown in the drawings the two insulators 13 are threadedly connected by screwing the enlarged outer end portion 50 of the pin 38 on the left hand insulator 13 into the hollow boss 48 of the right hand insulator cap 37. Connection between the jaw terminal bracket 12 and the left hand insulator cap 37 is effected by means of a threaded stud 52 which screws into the hollow boss 34 of the jaw terminal bracket and into the hollow boss 48 of the left hand insulator cap 37; and connection between the hinge terminal bracket 11 and the right end insulator 13 is effected by screwing the threaded hollow boss 25 of the hinge terminal bracket onto the enlarged threaded outer end portion 50 of the right hand insulator pin 38. In order to prevent loosening between the various parts of the switch 10 due to torsional strains in the power transmission line L, each of the bosses 25, 34, and 48 is provided with a radial hole, numbered 25a, 34a and 48a, respectively; the enlarged end portion 50 of the pin 38 is provided with a radial hole 50a; and the threaded stud 52 is provided with two radial holes 52a and 52b. During assembly the holes in the pin and in the stud are aligned with the holes in the bosses so that the drive pins 53 may be inserted to prevent loosening of the threaded connections.

As previously indicated, the cap and pin strain insulators 13 are broadly old and well known in the art; but it is novel to threadedly connect two or more such insulators in series and to threadedly connect opposite ends of the series to terminal brackets so that they may be a part of an electric circuit disconnect switch for a power transmission line.

Referring now particularly to FIGS. 2, 4 and 5, the bridging blade 14 is a hollow square in cross section, and its hinge end is received between a pair of parallel flanges 19a of the hinge fitting 19, and the pivotal connection 15 for the bridging blade is by means of a bolt 15a which impales aligned holes in the flanges 19a and in the side walls of the bridging blade.

A latch jaw assembly on the jaw terminal bracket 12 includes a pair of jaw springs 54 and jaw shoes 55 the upper ends of which flank the depending central portion 31 of the transverse jaw terminal flange 30 and have holes aligned with the hole 32 in said central portion 31 so that they may be firmly clamped by the bolt 33 and a nut 33a. The jaw shoes 55 are provided with confronting silver contact rivets 56 which bear on the sides of the bridging blade 14 when the blade is connected with the jaw terminal bracket as shown in the drawings.

A releasable latching connection between the bridging blade 14 and the jaw means is provided by an integral hook 57 on the depending central portion 31 of the hinge terminal bracket transverse flange 30, and a latch hook 58 which is pivotally mounted in the bridging blade 14 on a cross pin 59 is urged by a spring 60 into a position to engage the latch hook 57. Disengagement of the pivoted latch member 58 from the latch hook 57 is effected by a pull ring 61 which is pivotally mounted in the bridging blade 14 on a cross pin 62. A cam nose 63 on the pull ring bears upon a cam surface 64 of the latch 58 so that when the pull handle 61 is pulled downwardly, as by means of a hook stick, the rotary motion of the cam nose 63 about the pin 62 turns the latch 58 clockwise as seen in FIG. 4 to disengage it from the hook 57. The thrust of the spring 60 normally retains the latch 58 in engagement with the hook 57 and the interengagement between the cam nose 63 and the cam surface 64 also hold the pull ring in the position illustrated in the drawings.

The pull ring 61 has an upwardly extending control finger 65 provided with lateral stop lugs 66 which bear on the underside of the bridging blade 14, and the control finger 65 has a wedge shaped upper end portion 65 which seats in a complementary V notch in a spring receiving finger 67 of the latch 58. The engagement between the finger 67 of the latch 58 and the finger 65 of the pull ring 61 is for the purpose of preventing damage to the thin bottom wall of the blade 14 from the stops 66 on the handle if the blade is slammed to its closed position by pushing forcibly on the ring, as with a hook stick. In such circumstances, the spring finger 67 supports the pull ring finger 65 and absorbs most of the load of the closing force exerted against the pull ring.

During closing, the latch 58 is cammed around the latch hook 57 by engagement of their cam faces 58a and 57a, respectively. Until that occurs, the finger 67 continues to support the pull ring, so the sudden strain on the ring occasioned by slamming contact of the cam faces is partly absorbed by the latch.

The foregoing detailed description is given for clearness of understanding only and no unnecessary limitations should be understood therefrom, as modifications will be obvious to those skilled in the art.

I claim:

1. Electric circuit disconnect means for a power transmission line comprising, in combination:

a series of cap and pin strain insulators, each of said insulators including a cap member having a threaded axial boss portion and a pin member having a threaded end portion, one of said threaded portions being internally threaded and the other of said threaded portions being externally threaded and the insulators of said series being connected to one another by interengagement of said threaded portions;

electrically conductive jaw terminal bracket means threadedly connected to a member at one end of said series of insulators, said jaw terminal bracket means having means coaxial with the insulators for supportively connecting it to a power transmission line, a mounting area to receive a current carrying line for direct, current conducting connection into said power transmission line, and an extension provided with jaws to receive the free end of a bridging blade;

electrically conductive hinge terminal bracket means threadedly connected to a member at the other end of the series of insulators, said hinge terminal bracket means having means coaxial with the insulators for supportively connecting it to a power transmission line, a mounting area to receive a current carrying line for direct, current conducting connection into said power transmission line, and an extension aligned with that on the jaw terminal bracket means;

and an electrically conductive bridging blade pivotally mounted on said extension of the hinge terminal bracket means for separable connection with said jaws.

2. The combination of claim 1 in which the cap boss is hollow and is internally threaded, and in which the pin is externally threaded.

3. The combination of claim 2 in which the jaw terminal bracket means and the hinge terminal bracket means include hollow bosses which are internally threaded, in which a threaded stud is screwed into one of said hollow bracket bosses and into the hollow cap boss, and in which the pin is screwed into the other of said hollow bracket bosses.

4. The combination of claim 1 in which the jaw terminal bracket means and the hinge terminal bracket means include hollow bosses which are internally threaded, in which a threaded stud is screwed into one of said hollow bracket bosses and into the internally threaded portion of one of the insulator members, and in which the externally threaded portion of one of the insulator members is screwed into the other of said hollow bracket bosses.

5. The combination of claim 1 in which the internally and externally threaded portions of each insulator have radial holes, the holes in the threadedly connected portions of the insulators in the series are aligned, and a pin impales said aligned holes.

6. The combination of claim 1 in which the jaw terminal bracket means and the hinge terminal bracket means include hollow bosses which are internally threaded and have radial holes, a threaded stud is screwed into one of said hollow bracket bosses and has a radial hole aligned with the radial hole in said boss, and a pin impales said holes.

7. The combination of claim 1 in which the mounting areas of the jaw terminal bracket means and of the hinge terminal bracket means are above the coaxial means, and in which the extensions of both said bracket means project downwardly.

\* \* \* \* \*